(12) United States Patent
O'Krafka et al.

(10) Patent No.: US 11,327,966 B1
(45) Date of Patent: May 10, 2022

(54) DISAGGREGATED QUERY PROCESSING ON DATA LAKES BASED ON PIPELINED, MASSIVELY PARALLEL, DISTRIBUTED NATIVE QUERY EXECUTION ON COMPUTE CLUSTERS UTILIZING PRECISE, PARALLEL, ASYNCHRONOUS SHARED STORAGE REPOSITORY ACCESS

(71) Applicant: Wind Jammer Technologies, LLC, Cupertino, CA (US)

(72) Inventors: Brian Walter O'Krafka, Austin, TX (US); John Richard Busch, Cupertino, CA (US); Manavalan Krishnan, Fremont, CA (US); Kai Rothauge, Fortuna, CA (US)

(73) Assignee: Wind Jammer Technologies, LLC, Cupertino, CA (US)

( * ) Notice: Subject to any disclaimer, the term of this patent is extended or adjusted under 35 U.S.C. 154(b) by 0 days.

(21) Appl. No.: 17/017,318

(22) Filed: Sep. 10, 2020

Related U.S. Application Data

(60) Provisional application No. 62/898,331, filed on Sep. 10, 2019.

(51) Int. Cl.
*G06F 16/00* (2019.01)
*G06F 16/2452* (2019.01)
(Continued)

(52) U.S. Cl.
CPC ...... *G06F 16/24526* (2019.01); *G06F 16/248* (2019.01); *G06F 16/2456* (2019.01);
(Continued)

(58) Field of Classification Search
CPC .... G06F 9/455; G06F 9/45558; G06F 9/5077; G06F 11/1482; G06F 11/3006; G06F 11/3055; G06F 11/3409; G06F 12/023; G06F 12/0253; G06F 2009/45566; G06F 2009/45583; G06F 21/31; G06F 2201/81; G06F 2201/865; G06F 2212/151;
(Continued)

(56) References Cited

U.S. PATENT DOCUMENTS 10,528,599 B1 * 1/2020 Pandis ............... G06F 16/2455
10,713,252 B1 * 7/2020 Bourne ............... G06F 16/9032
(Continued)

*Primary Examiner* — Shyue Jiunn Hwa
(74) *Attorney, Agent, or Firm* — Brokaw Patent Law PC; Christopher J. Brokaw

(57) ABSTRACT

Executing a query in a disaggregated cluster. A query is received at the disaggregated cluster. A query graph is created based on the query that identifies a hierarchy of vertices, where each vertex is associated with a set of data responsive to at least a portion of the query. The compute nodes process the query graph by first identifying all tables, files, and objects stored on the storage nodes whose access is required to retrieve data that satisfy the query. Next, the compute nodes selectively assign the identified tables, files, and objects to a leaf vertex of the query graph to optimize retrieving data from the storage nodes. Thereafter, the compute nodes process the retrieved data sets associated with each vertex using separate threads of execution for each vertex of the query graph such that leaf vertices are performed in parallel. The compute nodes then provide a result set.

18 Claims, 9 Drawing Sheets

(51) Int. Cl.
*G06F 16/2453* (2019.01)
*G06F 16/2458* (2019.01)
*G06F 16/2455* (2019.01)
*G06F 16/25* (2019.01)
*G06F 16/248* (2019.01)
*G06F 16/28* (2019.01)

(52) U.S. Cl.
CPC .... *G06F 16/2471* (2019.01); *G06F 16/24532* (2019.01); *G06F 16/24552* (2019.01); *G06F 16/258* (2019.01); *G06F 16/285* (2019.01)

(58) Field of Classification Search
CPC .. G06F 9/45533; G06F 9/4881; G06F 9/5083; G06F 9/5088; G06F 16/283; G06F 16/24556; G06F 16/285; G06F 16/9535; G06F 16/24532; G06F 16/2455; G06F 16/284; G06F 16/244; G06F 16/245; G06F 16/24539; G06F 16/2465; G06F 16/26; G06F 16/30; G06F 16/35; G06F 16/954; G06F 11/273; G06F 15/16
See application file for complete search history.

(56) References Cited

U.S. PATENT DOCUMENTS

2009/0018996 A1* 1/2009 Hunt ................ G06Q 30/02
2019/0303405 A1* 10/2019 Kothari ............. G06F 16/9024

* cited by examiner

DISAGGREGATED QUERY PROCESSING ON DATA LAKES BASED ON PIPELINED, MASSIVELY PARALLEL, DISTRIBUTED NATIVE QUERY EXECUTION ON COMPUTE CLUSTERS UTILIZING PRECISE, PARALLEL, ASYNCHRONOUS SHARED STORAGE REPOSITORY ACCESS

CLAIM OF PRIORITY

The present application claims priority to U.S. Provisional Patent Application No. 62/898,331, filed on Sep. 10, 2019, entitled "Massively Parallel Processing with Precise Parallel Prefetching on Data Lake Cloud Object Stores," the disclosure of which is hereby incorporated by reference for all purposes as if fully set forth herein.

FIELD OF THE INVENTION

Embodiments of the invention generally relate to executing a query in a disaggregated cluster, and more particularly, relate to executing a query in a disaggregated cluster in a massively parallel fashion.

BACKGROUND

The financial cost involved in maintaining computer systems and software responsible for storing and managing digital data has steadily declined over the years. At the same time, the need has arisen to process large data sets using a variety of different applications, analytics, artificial intelligence (AI), and machine learning techniques for a multitude of purposes. These trends have been generally referred to and acknowledged in the mass media vis-à-vis the use and popularity of the term "big data," defined by the Oxford Language dictionary as extremely large data sets that may be analyzed computationally to reveal patterns, trends, and associations, especially relating to human behavior and interactions.

Collections of digital data that accumulate in modern digital storage systems are often arranged in a data lake. A data lake is a centralized repository that allows one to store structured and unstructured data at any scale. Data lakes naturally develop in storage ecosystems because data may be stored as-is without having to structure the data. It is this feature which distinguishes a data lake from a data warehouse, as a data warehouse is a database optimized to analyze relational data coming from transactional systems and line of business applications. The data structure and schema of a data warehouse are defined in advance to optimize the processing of SQL queries.

Data lakes are typically realized using a highly available shared storage repository decoupled from compute clusters and accessed over an interconnect network, such as an Ethernet, into which authoritative data is stored, such as a public cloud object store (for example, Amazon S3, Azure Data Lake Store (ADLS), or Google Cloud Object Store (GCS)) or a shared storage system that supports the Hadoop Distributed File System (HDFS) or the Network File System (NFS) protocol.

Separation of the physical computer systems responsible for performing computational work (collectively known as compute nodes) and responsible for storing digital data (collectively known as storage nodes) is a common architecture for big data applications in large-scale deployments in enterprises and in public clouds. This deployment model enables independent provisioning, scaling, and upgrading of compute clusters and storage clusters. Compute clusters may be created on-demand, as additions and changes may be made to the number of physical computer systems constituting nodes of the cluster (this flexibility is termed elastic scaling). In particular, nodes of a cluster may be transient in that they may be made available for inclusion in the cluster by a third-party only for a limited time, and only a short programmatic advance warning of their unavailability (for example, thirty seconds) may be given. An example of a transient node is Amazon's EC2 Spot Instance.

Providing efficient and fault tolerant query execution on disaggregated, transient, elastic compute clusters with data lakes presents many fundamental challenges to the present state of the art, such as performance, financial cost, and fault tolerance.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
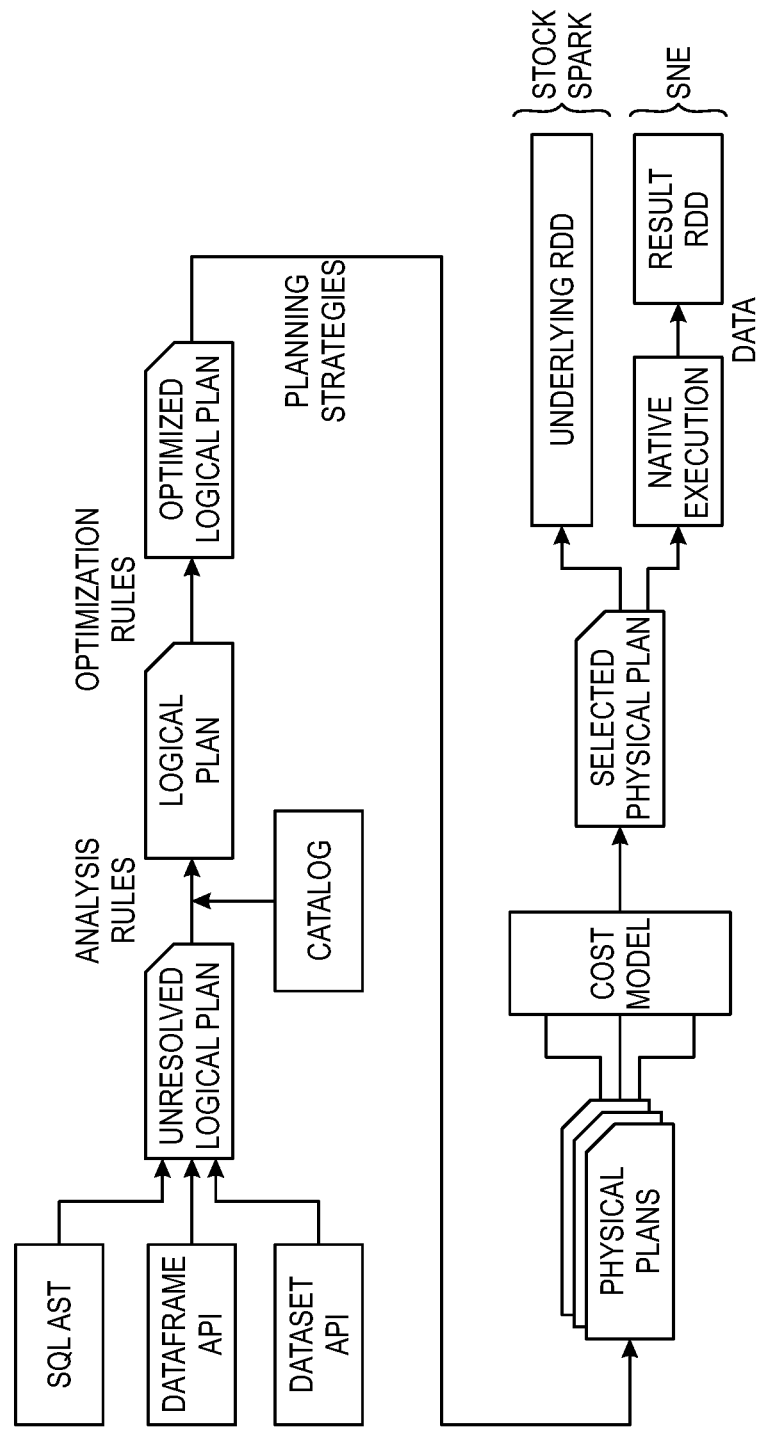
FIG. 1 is a block diagram of a control flow for invoking Spark Native Execution (SNE) during operation of the Apache Spark architecture in accordance with an embodiment of the invention.

Approaches for executing a query in a disaggregated cluster in a manner that possesses many advantages over the present state of the art are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Functional Overview

Embodiments of the invention are directed towards executing a query in a disaggregated cluster in a massively parallel fashion which enjoys many advantages over the prior art, including but not limited to efficiency, fault tolerance, and cost effectiveness. To illustrate, embodiments employ a native pipeline for massively parallel processing (MPP) execution of queries which may be transparently integrated into an existing analytic and/or machine learning framework.

Embodiments further enable the maximal exploitation of shared storage and network bandwidth to achieve high performance, fault tolerant querying on data lakes by deploying per-compute node parallel threads for asynchronous data lake prefetching, intermediate data spilling, and checkpointing. Embodiments may also optimize cloud store bandwidth utilization through precise data access through precise parallel prefetching of data stored in one or more data lakes in which all prefetched data is required for query execution based on a vertical software stack integration of the query plan semantics interpretation layer with the parallel storage access scheduling layer.

Embodiments will be discussed herein that utilize minimized and precise spilling and checkpointing processes. Prefetched data may be staged in the local file system of a node, for example in a RAMFS file system, so as not to incur local storage writes and is released after use. The precise prefetched data of an embodiment is minimal in size, is rapidly consumed in the MPP pipeline, and thereafter released; these characteristics enable the use of the RAMFS file system.

In one embodiment of the invention, a variant process for precisely prefetching data may be used which efficiently implements a query data cache in one or more compute nodes of a cluster. In this embodiment, file writes of precise prefetched data may be written by a compute node to a file system backed in local storage, thereby allowing an amount of written data to persist in local storage up to the maximum configured cache size. This file system is treated as a Least Recently Used (LRU) cache on subsequent queries and checked first for query data before initiating new prefetches to shared storage.

Embodiments of the invention may achieve enhanced performance by executing queries entirely in the DRAM of the cluster using in-memory hash joins and aggregations rather than sort merge joins and aggregations with spilling accomplished by the native MPP engine of an embodiment. The native MPP engine of an embodiment minimizes memory usage and performs dynamic estimation of cluster execution requirements and resource availability to select in-memory hash joins and aggregations when possible.

Embodiments of the invention may efficiently persist and access intermediate files in highly available (HA) shared storage, such as a cloud store, outside of the co e nodes of the cluster. When execution of operations in dynamic random access memory (DRAM) is not possible due to the involved data sets being too large in size to be accommodated in the DRAM of the cluster (as may be the case when performing large merge sorts), embodiments may employ HA shared storage or a cloud store to asynchronously and in parallel persist and fetch intermediate files in large blocks. Doing so maximizes the availability of the intermediated data as no local node storage is used that might be lost in a node preemption or a cluster failure, minimizes the impact to performance by the use of large parallel asynchronous transfers, and avoids the cost and complexity of relying upon specialized hardware for fault recovery.

Embodiments may employ an efficient, HA shared storage/cloud store based asynchronous intermittent precise checkpoints and recovery mechanism. The HA shared storage/cloud store may be used to asynchronously and in parallel persist precise checkpoint information. The checkpoint information is minimal since intermediate files are already located in HA shared storage; consequently, the checkpoint information often can use pointers to refer to them. The use of HA shared storage/cloud store by embodiments maximizes availability while avoiding cost and complexity of relying upon specialized hardware for fault recovery.

The above description of embodiments is neither meant to enumerate a comprehensive set of embodiments discussed herein nor meant to provide a complete listing of advantages or benefits of any one or more embodiment.

Spark Native Execution (SNE)

An illustrative embodiment shall be referred to herein as Spark Native Execution (SNE). The SNE comprises software that may execute upon an Apache Spark Core. SNE fully exploits the bandwidth of a shared storage repository using Precise Parallel Prefetching on Data Lakes (PP-PonDL). This prefetching performed by the SNE exploits a priori knowledge of which data will be used in a query to, asynchronously and in parallel, precisely prefetch large blocks of the required data for a query from a data lake shared storage repository so as to minimize the query elapsed time in deployments with separate disaggregated compute and storage. This innovation allows for the perfectly efficient exploitation of the network and shared storage repository bandwidth to mask high data lake cloud store latency and variability, thereby optimizing query performance. Knowledge of the precise data to prefetch is accomplished by embodiments by integrating the query optimizer plan with the I/O logic which fetches data from one or more data lakes.

SNE utilizes parallel precise prefetching with a massively parallel processing (MPP) pipelined data flow query processing engine to minimize query processing stalls. Multiple parallel threads in MPP compute nodes prefetch the required query data to fully utilize the interconnect bandwidth between the compute nodes and the slower data lake shared storage repository, while prefetch completion threads in the compute nodes feed the data in large blocks to the parallel processing threads in a pipeline process across the compute cluster in a dataflow manner without serializations.

In an embodiment, SNE supports the MPP data flow query processing engine with a single click install into a provisioned cluster, with shared storage repository-based asynchronous intermittent precise checkpoints, and precise spilling of transient application data to the shared storage repository. This enables SNE to perform efficient fault tolerant query execution on transient, elastic compute clusters with disaggregated storage. By utilizing highly parallel and asynchronous shared storage repository access for precise checkpoint and spill data, embodiments eliminate any dependency on cluster local data or a specialized shared storage system without impacting query performance while providing full query fault tolerance.

Transparent Integration of Sne into Spark Architecture

FIG. 1 is a block diagram of a control flow for invoking Spark Native Execution (SNE) during operation of the Apache Spark architecture in accordance with an embodiment of the invention. SNE may seamlessly and transparently integrate into the Apache Spark architecture as a Java Archive (JAR) file into an existing Spark cluster installation or as a Spark build using an install script.

During job execution, an application may submit a query to the Apache Spark architecture through SQL, a Dataframe Application Programming Interface (API), a Dataset API, or streaming Spark libraries. The Apache Spark architecture transforms the submitted query into a logical plan. Thereafter, the Apache Spark architecture transforms the logical plan into a physical plan, which is represented as a Directed Acyclic Graph (DAG).

Query processing is then handed off by the Apache Spark architecture to SNE after the physical plan has been created. When an action causes the Apache Spark architecture to initiate the processing of a query, the SNE transparent integration code serializes the spark plan (DAG) and calls SNE to process the DAG, e.g., via a Scala native command call. SNE parses the physical query plan (DAG), compiles the DAG to the C programming language referencing SNE operators, compiles the C code to native code, and then SNE executes the MPP engine with parallel precise cloud store prefetching, spilling, and checkpointing to complete the query.

After SNE has prepared the result data, the SNE transparent integration code places the result data into a Resilient Distributed Dataset (RDD), a data structure representing data in the Spark architecture, if required and emulates the same return of DAG execution as the Apache Spark architecture does itself. If SNE does not return a success completion code, the query is handed off to the Apache Spark architecture path for execution.

Advantageously, SNE native query acceleration can be transparently incorporated into an existing analytic framework. SNE native query acceleration can be optionally enabled through a configuration parameter, which enables low risk testing in a deployment environment. Failover to the Apache query execution engine ensures all queries will complete with the same semantics when the SNE native query execution engine cannot process the query.

SNE Vertical and Horizontal Scaling in Compute Clusters

Figure 2:
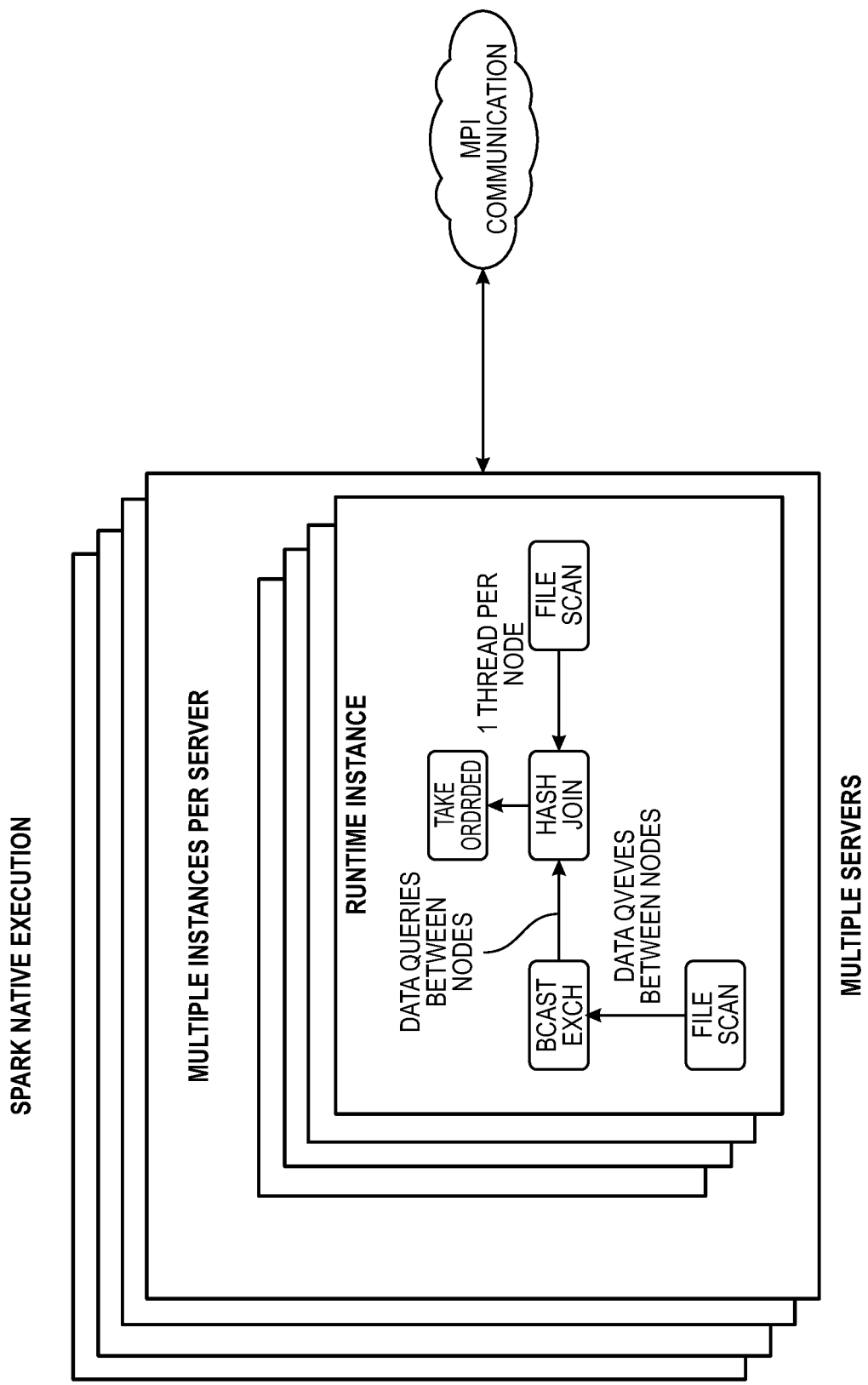
FIG. 2 is an illustration of SNE scaling within and between cloud servers in accordance with an embodiment of the invention.

FIG. 2 is an illustration of SNE scaling within and between cloud servers in accordance with an embodiment of the invention. As shown in FIG. 2, when deployed in a compute cluster, SNE instances may be both vertically scaled across virtual CPUs (vCPUs) in a cloud server and horizontally scaled across cloud servers in a cluster to maximize concurrent execution and query throughput while minimizing query response times. As shown in FIG. 2, multiple instances of SNE software may, but need not, execute upon each single physical compute node of the compute nodes composing the cluster. In this way, each separate instance of SNE executing on a single physical compute node may operate independently but in a cohesive fashion. Message Passing Interface (MPI) may be used to communicate within and between SNE instances.

SNE MPP Query Processing

Figure 3:
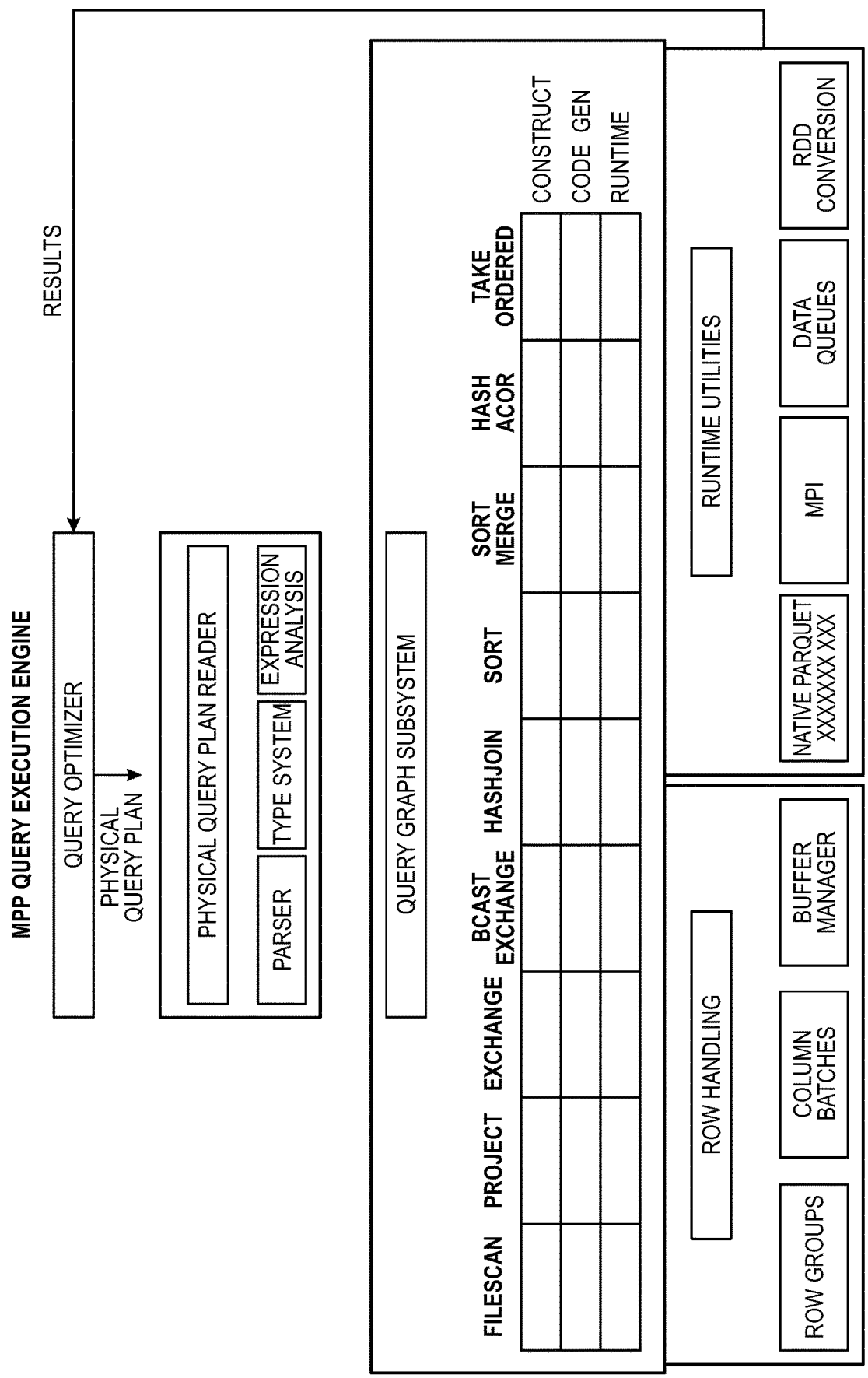
FIG. 3 is an illustration of a SNE Massively Parallel Processing (MPP) Query Processing Engine Instance in accordance with an embodiment of the invention.

FIG. 3 is an illustration of a SNE MPP Query Processing Engine Instance in accordance with an embodiment of the invention. Physical plans are represented as a DAG, which is composed of nodes. To avoid confusion, the nodes of a query graph shall be referred to herein as a query node, while the physical computer systems composing a cluster shall be referred to herein as either compute nodes or storage nodes. Thus, a query node refers to an entirely different concept than either a compute node or a storage node. For ease of explanation, a query node discussed in terms of performing some action or work may be implemented by a compute node performing the action or work associated with that query node.

Each query node in an SNE query graph is associated with work which may be performed by a separate runtime instance of SNE. Each runtime instance responsible for performing the work associated with a query node possesses its own thread, which may dequeue row groups from its child(ren), processes them, and passes new row groups onto its parent. Query node processing is thus pipelined, and the memory consumed is determined by the total number of row groups in flight. Operators exchange, merge, and join with concurrent counterparts in other vCPUs and cloud servers using MPI to complete queries as shown in FIG. 2.

Figure 4:
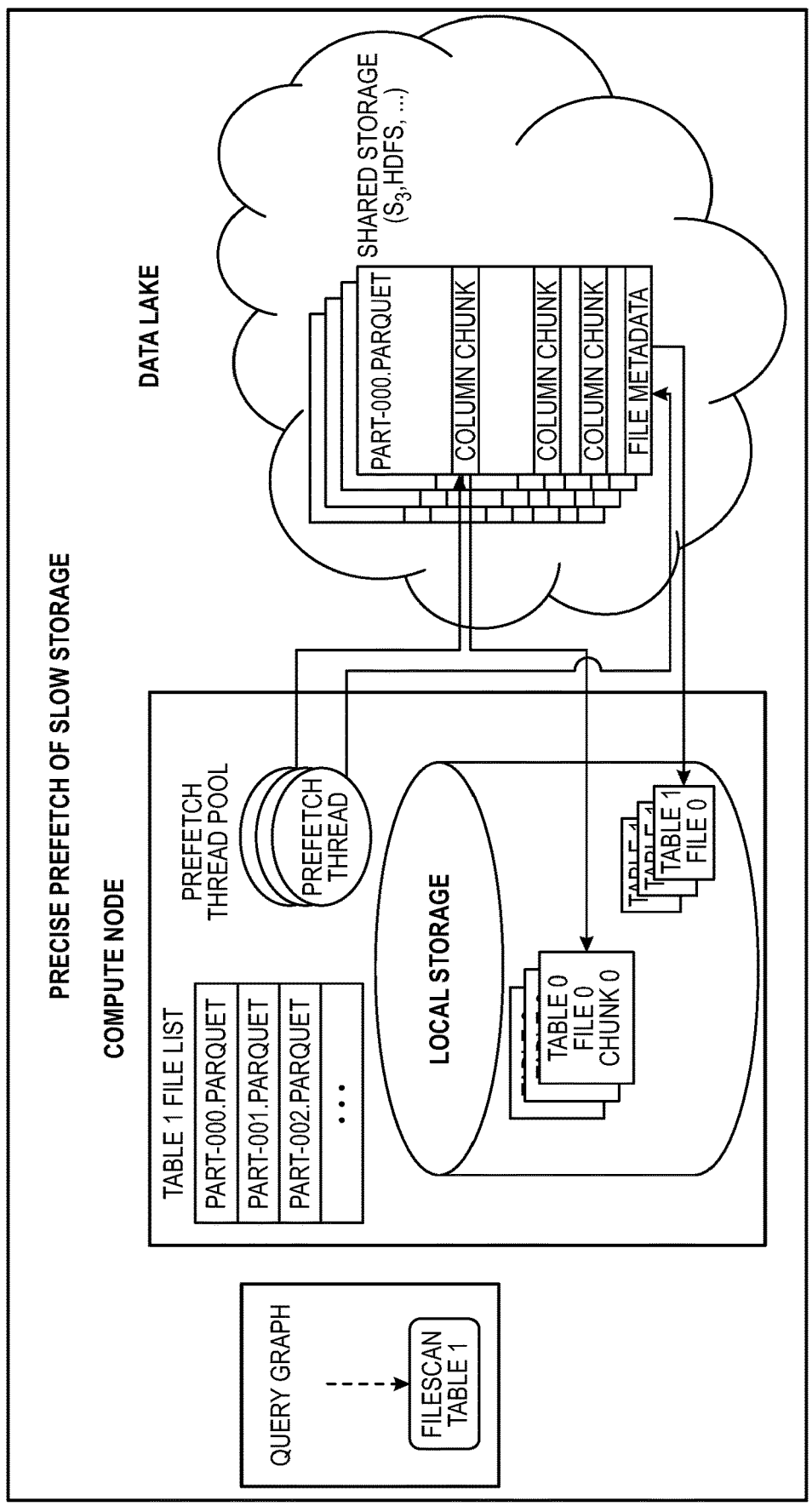
FIG. 4 is an illustration of Parallel Precise Prefetching (PPP) of Data Lake data stored in shared storage in accordance with an embodiment of the invention.

FIG. 4 is an illustration of Parallel Precise Prefetching (PPP) of Data Lake data stored in shared storage in accordance with an embodiment of the invention. At the beginning of query processing, SNE identifies all tables storing data responsive to at least a portion of the query and locates all relevant files and objects in shared storage using the query graph and table metadata. SNE also determines which file partitions and which column chunks are needed from the involved file partitions.

Parallel prefetching is optimized for data stored in a column-oriented storage format. In a column-oriented storage format, the data values for a particular column are stored in chunks. This allows very efficient scanning when only a subset of the columns of a table are involved, i.e., are responsive to the query. Examples of column-oriented storage formats are Parquet and Orc. Reading from column-oriented storage formats may be accomplished by the leaf FileScan query nodes in the query graph, one per dataset file partition.

To illustrate, a FileScan query node is a particular type of query node associated with reading columns of data from one or more files. The files may be stored either locally or in some distributed storage service, such as Amazon S3, Hadoop Distributed File System (HDFS), and the like. A runtime instance of SNE executing upon a compute node of the cluster may perform the work associated with a FileScan leaf node in the query graph, e.g., by loading certain data to a parent node in the query graph to as input to the graph computation. For example, each FileScan query node may define a workload to load column chunks for its file partition. Each FileScan query node is provided a list of one or more files to be scanned. File scanning may be done one row group at a time. The performance of the workload defined by the FileScan query node may read a compressed row group from a Parquet file, decompress the file, decode the file, and pass the decoded file on as an SNE in-memory rowgroup structure to the parent node in the query graph.

As discussed previously, each query node in an SNE query graph is serviced by its own thread that dequeues row groups from its child(ren), processes them, and passes new row groups on to its parent. Query node processing is thus pipelined and the memory consumed is determined by the total number of row groups in flight. To mask the latency of shared storage accesses, the query node workload fetches column groups in advance and destages them to the local file system of the compute node performing the query node workload.

The prefetched data is small compared with the size of the compute node DRAM. The prefetched data is rapidly consumed and released; as a result, SNE typically exploits system memory for destaging prefetched data. Destaging is typically performed in RAMFS or in-memory file system cache so no local storage spills are incurred. If the in-memory file cache overflows, fast local persistent storage (e.g. non-volatile random-access memory (NVRAM) or a solid-state device (SSD)) may be used to destage prefetch data to maximize performance. SSD overflow of destaged data can optionally be used to implement a Least Recently Used (LRU) cache of prefetch data to accelerate subsequent queries.

The number of prefetches in flight is a configurable parameter which can override the dynamic optimization heuristic, as is the total amount of local file storage that can be used for destaging. Prefetching is done by enqueuing prefetch requests to a per-scanner prefetch thread-pool, e.g., a thread-pool implemented in POSIX threads (pthreads). Completed prefetches for a query node workload are passed back to the compute node responsible for that query node workload via a return queue. FileScan query nodes read column chunks from local files.

After data has been used, the local file that destaged the prefetch data is deleted unless optional caching has been enabled. Since the exact sequence of column chunks required for each file scanner is known in advance, all prefetches are used. The motivation is to have sufficient prefetching to saturate the available storage bandwidth. The particular storage subsystem that SNE uses may be configured via SNE command line parameters. Non-limiting examples of storage subsystems usable by SNE include local storage, Amazon Web Services S3, Google Cloud Storage (GCS), Microsoft® Azure Blob, and Hadoop Distributed File System (HDFS).

SNE Efficient Spilling Using Shared Rather than Local Storage

SNE stages data and selects algorithms to execute queries entirely in the DRAM of the cluster if possible. However, if operations on the data sets are too large to complete in cluster DRAM (e.g., the amount of data is sufficiently large to prevent the performance of an in-memory hash join and therefore a sort merge join must be performed), SNE creates one or more intermediate files to extend to storage. In such cases, SNE needs to persist the intermediate files outside of the compute cluster to enable job recovery from crashes, loss of one or more nodes or the compute cluster due to failure, preemption, or elastic scaling. If the intermediate files, which are required for checkpoint recovery, were stored in the local storage of a node, and the node storing an intermediate file lost the job, the query would have to be aborted and restarted from the beginning rather than restarted from the last checkpoint.

Embodiments of the invention are superior in this regard over the programming model MapReduce, as is used in Apache Spark, as embodiments may perform stream spilling and reading of large blocks (~10 MB-100 MB chunks), avoid the small I/O writes (~100 kB) involved in map operations, avoid staging (which waits for all map writes to complete before beginning reduce phase), and avoid small I/O reads of reduce operations.

Although SNE can spill to any shared storage while maximally utilizing the shared storage bandwidth, embodiments may preferably spill an intermediate file to a cloud store. Modern cloud stores, such as S3 and GCS, provide sufficient bandwidth per node to match local SSD performance and they provide the highest availability, including geo-replication. Embodiments that employ cloud store spilling are superior to approaches that store spill files or intermediate files into the local storage of nodes in the compute cluster since embodiments can achieve efficient fault tolerance. Embodiments that employ cloud store spilling are superior to approaches that store spill files or intermediate files into a cluster-external shared file system (such as NFS, RDFS, and external shuffle service) since embodiments can achieve lower cost and lower complexity.

Figure 5:
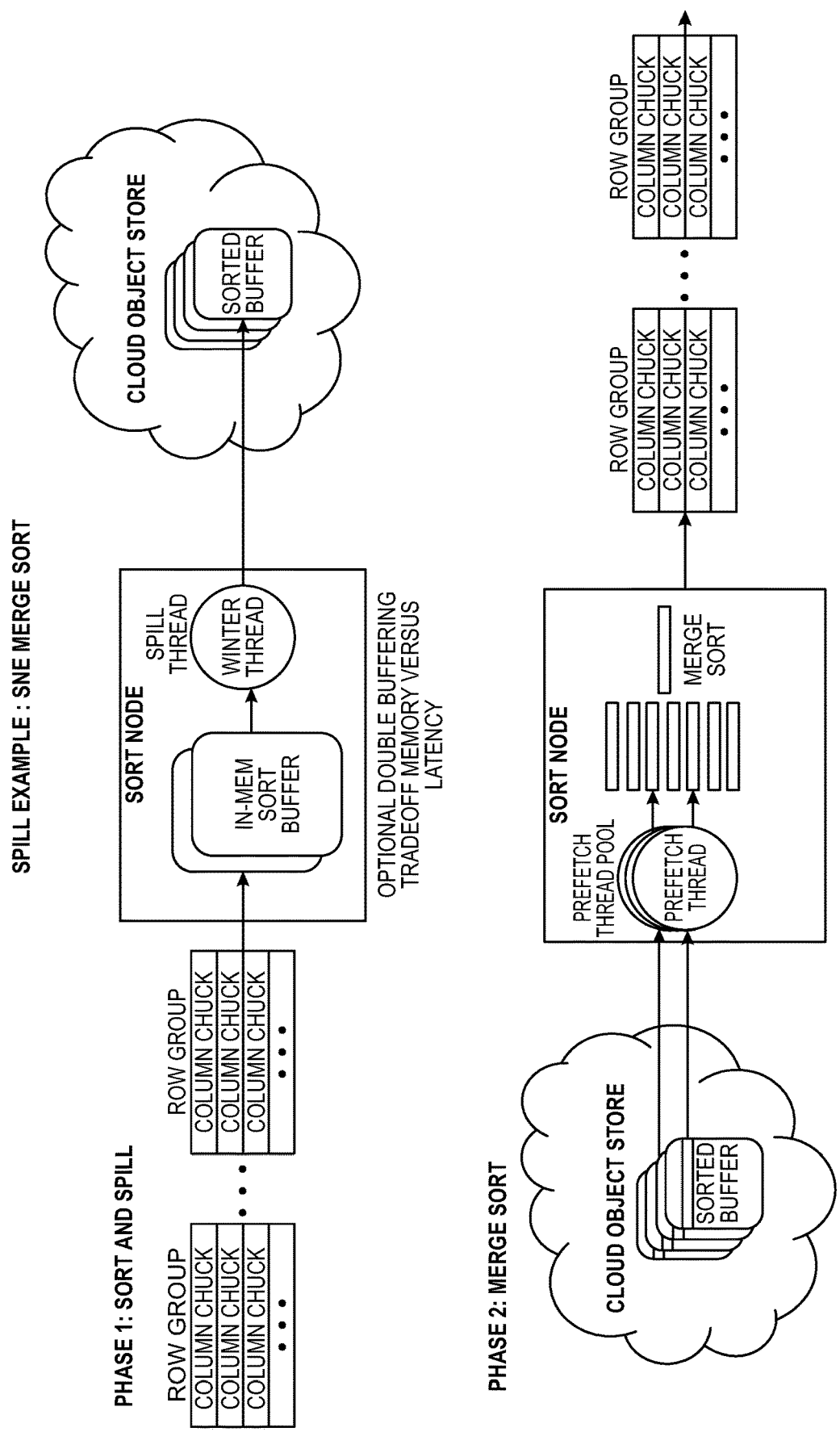
FIG. 5 is an illustration of a cloud store spilling data flow for a SNE Merge Sort operation in accordance with an embodiment of the invention.

FIG. 5 is an illustration of a cloud store spilling data flow for a SNE Merge Sort operation in accordance with an embodiment of the invention. Initially, data is sorted in roughly about 100 MB-1 GB sized chunks and intermediate files are stored to cloud object storage. All intermediate files for merge sorting are streamed, roughly about 10 MB at a time per file. The streamed data is stored roughly about 100 MB-1 GB at a time, across all incoming streams. For example, 1 TB of data may be merge-sorted via 100 10 GB files, streamed through 20 GB of memory via 100×10 MB chunks (double buffered). As another example, 100 TB of data may be merge-sorted via 2500 40 GB files, streamed through 50 GB of memory via 2500×10 MB chunks (double buffered).

In an embodiment, SNE Shared Storage Spilling stores intermediate sort files in a shared object storage, as it is fault tolerant and possesses higher bandwidth than local storage. The shared object store does not use much memory, as the shared object store is provided by cloud services. Exploiting the shared object store yields high performance as it fully exploits storage bandwidth via asynchronous write operations and prefetching.

SNE Fault Tolerance Though Shared Storage Based Checkpointing

SNE fault tolerance is achieved through cloud store-based asynchronous intermittent precise checkpoints and failure recovery. Checkpointing may also be performed by an embodiment by writing checkpoint data to shared storage external to the compute cluster.

SNE's parallel asynchronous access to shared storage fully utilizes the shared storage bandwidth; consequently, shared SNE storage spilling can match or exceed the performance of local storage. This also enables periodic checkpoints to be low overhead and expedient since the intermediate files may already reside on the shared store, therefore only a minimal amount of state needs to be saved in a checkpoint file.

Cluster failure recovery is necessary for long running jobs which may take hours or even days to complete running on large clusters of hundreds of compute servers. To ensure that a job completes in a timely manner, job progress needs to be locked in at interim points from which failure recovery restart can be performed. SNE checkpointing and failure recovery to a prior checkpoint is enabled by a Spark configuration parameter which specifies the checkpoint frequency (typically once every few minutes). The checkpoint data may be stored asynchronously into the cloud store. If there is a cluster interruption, the cluster state is reloaded from the cloud store to the last checkpoint, and then processing commences from that point on.

Figure 6:
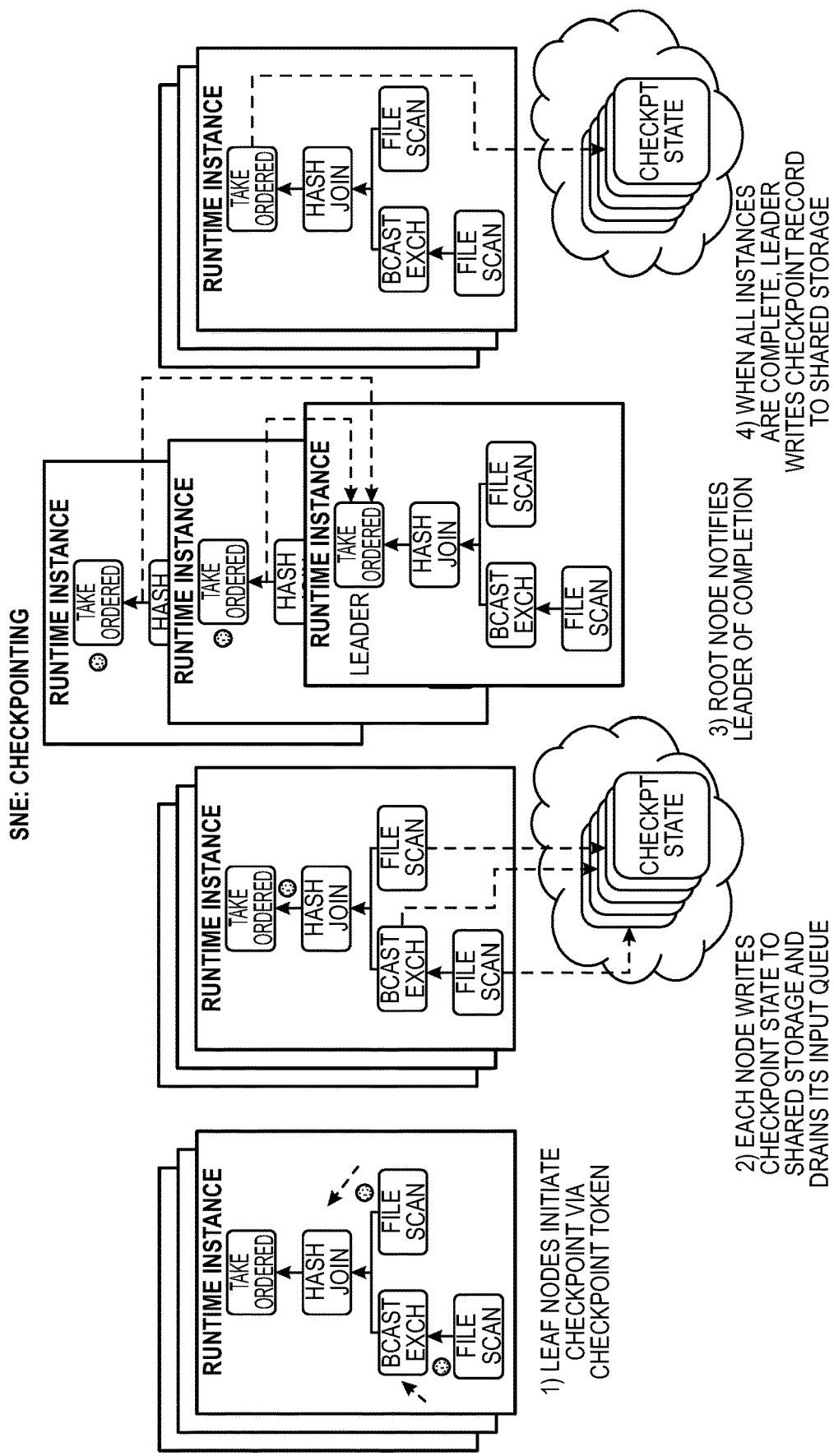
FIG. 6 is a dataflow diagram for a SNE checkpoint write operation in accordance with an embodiment of the invention.

FIG. 6 is a dataflow diagram for a SNE checkpoint write operation in accordance with an embodiment of the invention. As shown in the dataflow diagram of FIG. 6, leaf query nodes in each instance of a query graph initiate a checkpoint by propagating a checkpoint "token" to its parent(s). Upon receiving a checkpoint token, a query node drains its input queues and stores checkpoint state to cloud object storage; once complete, it forwards the token to its parent(s). The root nodes notify a particular process that has been deemed the leader instance (i.e., rank=0 in Message Passing Interface (MPI)) when they complete. In response, the leader instance writes a checkpoint completion record once all query nodes complete.

The performance impact of checkpoint operations performed by embodiments is negligible because the checkpoint state written is small in size and checkpointing is infrequent. Furthermore, the cloud object storage has high bandwidth and write operations are pipelined.

Figure 7:
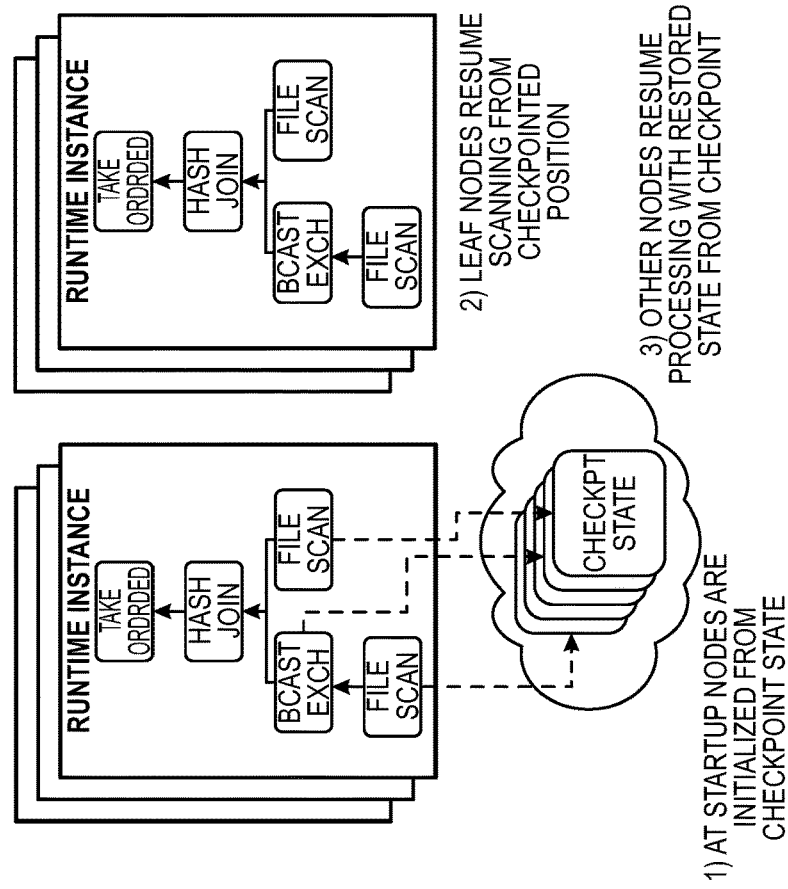
FIG. 7 is a dataflow diagram for a SNE checkpoint restore operation in accordance with an embodiment of the invention.

FIG. 7 is a dataflow diagram for SNE a checkpoint restore operation in accordance with an embodiment of the invention. As shown, to perform a checkpoint restore operation, upon startup of the SNE software all query nodes load their initial state from a previously checkpointed state.

Figure 8:
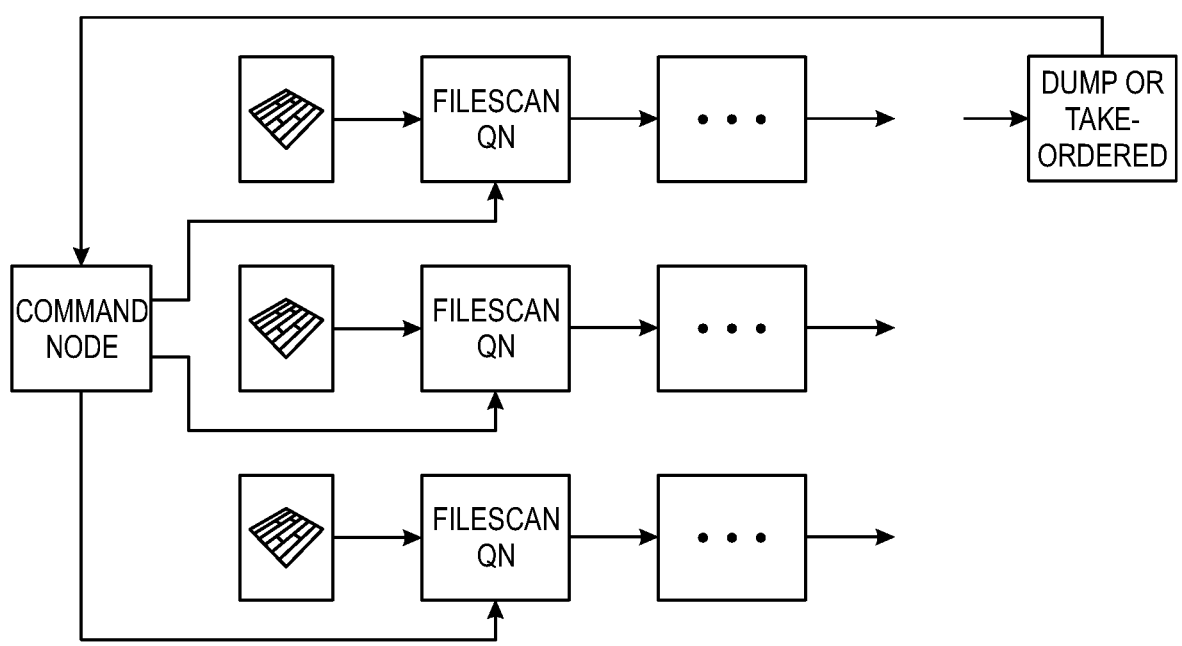
FIG. 8 is a query execution graph for checkpointing and recovery via a command node in accordance with an embodiment of the invention.

To enable checkpointing, SNE instructs each of the query nodes to persist their state to a cloud store or to load their state from the cloud store. A command query node may be used as a way to help facilitate the management of checkpointing operations; the command query node is connected to FileScan query nodes as a child node, and to the root node as a parent node, thereby turning the DAG of the query execution graph layout into a directed cycle graph, as can be seen in FIG. 8, which is a query execution graph to enable checkpointing and recovery via a command node in accordance with an embodiment of the invention. For simplicity, a Dump and TakeOrdered query node may be referred to as a root node even though this is technically a misnomer given the cyclic structure of the modified query graph.

In an embodiment, the command query node is responsible for sending the appropriate tokens to the FileScan nodes and waiting to receive the signal from the root node indicating that the checkpointing operation has been completed. In the case of multiple runtime instances of SNE, the command query node of each process communicates with the command query node of the lead process (rank 0). The command query node is also responsible for determining when a checkpoint needs to be stored or loaded. Certain embodiments may do so at regular time intervals as measured by the load command query node. A command query node may also be responsible for generating the file names of the new checkpoints and/or obtaining the name of the checkpoint to be loaded from the user.

In another embodiment, the lead command query node may be connected to an interactive User Interface (UI) so that the user can pause or resume execution of a query. Such an embodiment may dynamically allocate and deallocate resources or change input sources, e.g., when processing or assisting a streaming data application.

The command and query nodes may send the following tokens to their parent nodes, along with a pointer to a forwarded object, which can be, for example, either a checkpoint metadata object, a row group, or NULL, depending on context. Non-limiting, illustrative examples of tokens which may be sent by command and query nodes are depicted in Table 1.

TABLE 1

| Token name | Forwarded object | Description |
| --- | --- | --- |
| CMD_CKP_SAVE | Checkpoint metadata | Signal to persist state to a checkpoint |

TABLE 1-continued

| Token name | Forwarded object | Description |
| --- | --- | --- |
| CMD_CKP_LOAD | Checkpoint metadata | Signal to recover state from a checkpoint |
| CMD_CKP_DONE | NULL | Signal that the checkpointing operation has completed |
| CMD_RUN | Row group (if applicable, otherwise NULL) | Signal to process the data in the forwarded row group |

In an embodiment, after determining a new checkpoint should be created, the command query node sends a CMD_CKP_SAVE token to each of the FileScan query nodes. Alternatively, after determining a previously stored state should be loaded from a previously stored checkpoint, the command query node sends a CMD_CKP_LOAD token to each of the FileScan query nodes.

After loading a row group from its file (such as a Parquet file), the FileScan query node checks the status of the input message queue connected to the command query node. If the input message queue is empty, then the FileScan query node loads the next row group from the file and forwards it to the parent node along with the token CMD_RUN. Once there are no more row groups to load, the FileScan query node forwards NULL along with the token.

On the other hand, if the input message queue is not empty, then the FileScan query node dequeues the token sent from the command query node along with the checkpoint metadata. The token must be either CMD_CKP_SAVE or CMD_CKP_LOAD. The FileScan query node then forwards this token to its parent node along with the checkpoint metadata.

The checkpoint metadata may contain the base name of the checkpoint, <ckp_name>. Each query node creates a binary state file in the directory <ckp_name> with the name <ckp_name>_<query_node_name>. If a checkpoint must be created, i.e., the token is CMD_CKP_SAVE, then the query node persists its state to this file. On the other hand, if the token is CMD_CKP_LOAD, then the query node loads its state from this file. Once the state has been saved to or loaded from the state file, the query node enqueues the token CMD_CKP_DONE to the output message queue. This process will then repeat as necessary during operation. Note that if the SNE just created a checkpoint, then the input message queue should be empty.

The sequence for all other query nodes except the root nodes (such as a Dump query node or a TakeOrdered query node) is broadly as follows according to an embodiment. First, the token is dequeued from the input message queue connecting this query node to its child node. Next, if the token is CMD_RUN and the forwarded object is NULL, then there is no data left to process, and so the query node forwards the token CMD_RUN along with NULL to its parent node. On the other hand, if the token is CMD_RUN and the forwarded object is a row group, then the query node processes the data in the row group, then forward the token CMD_RUN along with the output row group to its parent node. If the token is CMD_CKP_SAVE or CMD_CKP_LOAD, then the query node immediately forwards this token to its parent node along with the checkpoint metadata. Once the state has been saved to or loaded from the state file, the query node dequeue the token CMD_CKP_DONE from the input message queue and forwards the token to its parent node.

Finally, root nodes such as Dump root query node and TakeOrdered root query node follow a similar procedure except that they do not forward the CMD_CKP_SAVE or CMD_CKP_LOAD tokens to their parent node, which is the command query node. The command query node does not need to persist its state, it simply needs to know when all of the query nodes have finished persisting their state.

By immediately forwarding the tokens CMD_CKP_SAVE or CMD_CKP_LOAD when they are dequeued, every query node starts persisting its state as early as possible, which is immediately after completing the processing of the data in the row group that the query node is currently working on and the row groups that are still in the input message queue. As a result, SNE first "drains the queue," i.e., all data currently being processed by any query node and in the input message queues will be processed by all downstream query nodes before those query nodes start persisting their state. This ensures that the in-flight data does not need to be stored, with the exception of hash tables, as discussed below.

Each query node forwards the CMD_CKP_DONE token only after it has persisted its state. This ensures that the command query node does not send the signal to start the next checkpoint while some query node(s) are still busy persisting their state. If this does happen, then the checkpoint interval is too small and the next scheduled checkpoint is skipped. Scheduled checkpoints are skipped until the command query node has received confirmation that the query nodes have completed persisting their state. Subsequent scheduled checkpoints are not moved forward to the earliest possible time to accommodate for skipped checkpoints.

An exception to the procedure outlined above is the manner in which Hash Join query nodes (HJQNs) handle checkpoints. This is because every HJQN has two input queues, each connected to a different child branch in the query graph, namely a broadcast queue and a streaming queue. Row groups coming in through the broadcast queue are used to create an in-memory hash table. Only after all the row groups from the broadcast branch have been dequeued and the hash table has been completed will row groups from the streaming queue start to get dequeued and their data be processed.

While the row groups in the broadcast queue are being dequeued, row groups are being added to the streaming queue from the streaming branch in the query graph, up to the maximum number of row groups that can be in flight, MAX_IN_FLIGHT. Once MAX_IN_FLIGHT row groups are in the streaming queue, no more row groups are processed by the query nodes in the streaming branch until row groups are dequeued from this queue, which only happens once the hash table is complete.

Therefore, there are two separate scenarios that need to be considered as far as persisting the state of the HJQN. If the HJQN receives the instruction to persist its state while dequeuing row groups from the broadcast queue, then these row groups form the basis of the hash table and must therefore be saved in the cloud store. Every time the HJQN receives a call to persist its state, only the row groups that it has received since the last checkpoint operation need be saved, since the prior row groups have already been saved to the cloud store in previous calls. Concurrently, the row groups in the streaming queue must be persisted to file, up to a maximum of MAX_IN_FLIGHT row groups.

Once the HJQN has received all the row groups and has completed the hash table, it can start dequeuing from the streaming queue. At this point, the hash table has already been fully persisted and the state that needs to be saved during a checkpoint call is small in terms of overhead.

Thus, the amount of state persisted by the HJQN will vary depending how far the hash join process was completed when the checkpoint operation was initiated. If the checkpoint operation is called before the hash table is completed, then the persisted state will include the data making up the hash table up to that point, as well as the row groups in the streaming queue, up to a maximum of MAX_IN_FLIGHT and the size of the row groups. If the checkpoint operation is called after the hash table has been completed, then the persisted state depends on the size of the hash table, which needs to be written to the cloud store only once, i.e., subsequent checkpoints do not need to write the contents of the hash table to the cloud store again since the contents of that hash table do not change.

The state that needs to be persisted by a sample of different query nodes is summarized in Table 2.

TABLE 2

| Query Node | Persisted State |
|---|---|
| FileScan | Position in scan, partition/file list |
| Broadcast Exchange | None |
| Hash Exchange | None |
| Range Exchange | Data samples, range partitions |
| Hash Join | Hash table OR partial hash table and row groups currently in streaming queue (see above discussion) |
| Sort | List of spill files (if merge sort required) |
| Sort merge join | Final rows just before checkpoint |
| TakeOrdered | Accumulated, ordered rows |
| Hash Aggregation | State of aggregation table at checkpoint |

In the case of multiple SNE runtime instances, each process handles the checkpointing as described above. The only difference is that the command query nodes do not autonomously schedule their checkpoints, but instead communicate (via MPI) with the command query node of the lead process (rank 0), which we refer to here as the lead command query node. Once it is time to create a checkpoint, the lead command query node sends a signal to the command query nodes of all the other processes to start the checkpointing operation. Once each process has completed persisting or recovering its state (as described above), its command query node sends a confirmation signal to the lead command query node. The lead command query node waits for all processes to complete their checkpointing before sending the signal to start the next scheduled checkpoint.

Additional Embodiments

Embodiments of the invention may be used to accelerate queries where the data is stored in compute nodes using local storage, e.g. HDFS on HDDs or SSDs. Embodiments of the invention may also be operated to access a plurality of different types of databases, including without limitation analytics, data warehouse, transactional, OLTP, NoSQL, and Graph. In addition to databases, embodiments of the invention may operate using any machine learning and AI framework/application and other classes of applications on data lakes.

SNE may be implemented as a "Execution Fabric" in additional data analysis applications (including Presto, Aurora, Flink, BigQuery) and in artificial intelligence (AI) and machine learning frameworks (e.g. PySpark, Dask, Ray, TensorFlow) and may be integrated into other databases and frameworks. In an embodiment, an Execution Fabric architecture may interface with custom or existing high-performance computing libraries to accelerate machine learning applications. Execution Fabric architecture of an embodiment may invoke user defined functions (UDFs) for fast native machine learning (ML) kernel invocation and zero copy, transformation-free data delivery. Execution Fabric architecture may also interface with custom or existing libraries for accelerating machine learning and AI applications and queries using GPUs, FPGAs, and other acceleration hardware.

Hardware Mechanisms

Figure 9:
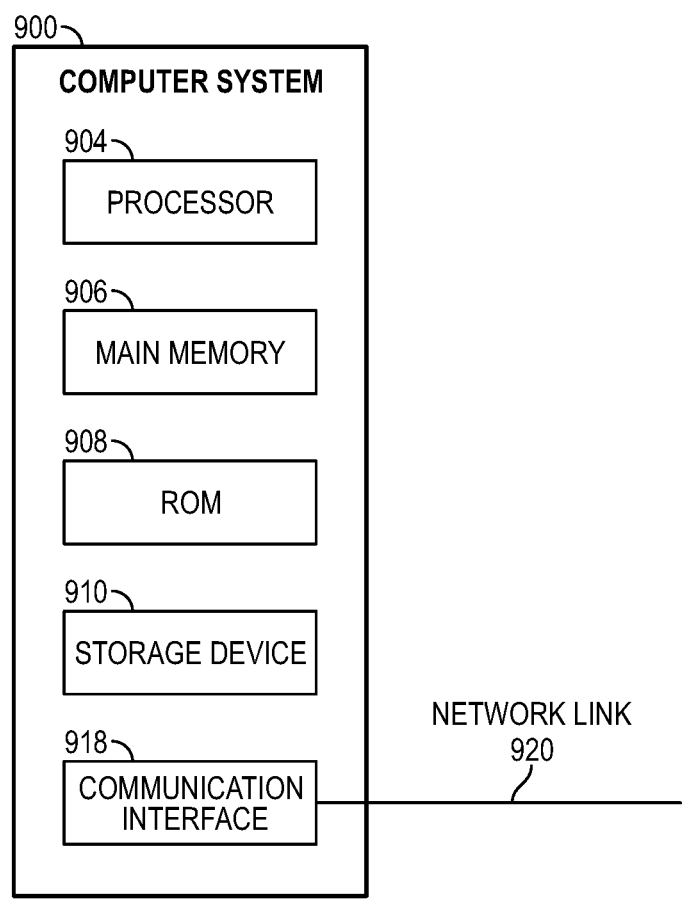
FIG. 9 is a block diagram that illustrates a computer system upon which an embodiment of the invention may be implemented.

In an embodiment, all nodes of a cluster, including any compute nodes and any storage nodes, may be implemented on a computer system. A computer system may also implement a client assessing a node of the cluster. One or more computer systems may operate in tandem to implement a cloud-based service accessible over a network. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random-access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), an LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in persistently storing instructions which may be provided to processor 904 for execution. Such a medium may take many forms, including optical or magnetic disks, such as storage device 910. As used herein, the term "non-transitory computer-readable storage medium" does not include propagation media, such as carrier waves.

Non-limiting, illustrative examples of non-transitory computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for executing a query in a disaggregated cluster, which when executed, cause:
   receiving, at the disaggregated cluster, the query, wherein the disaggregated cluster comprises one or more compute nodes and one or more storage nodes, wherein each of the one or more compute nodes and each of the one or more storage nodes are implemented by separate physical machines accessible over a network, wherein the one or more compute nodes are transient instances operated by a third party, and wherein operation of the one or more compute nodes can cease during the processing of the query;
   creating, at a particular compute node of the disaggregated cluster, a query graph based on the query, wherein the query graph identifies a hierarchy of vertices, wherein each vertex of the query graph is associated with a set of data responsive to at least a portion of the query;
   the one or more compute nodes processing the query graph by:
      (a) identifying all tables, files, and objects stored on the one or more storage nodes required to retrieve data that satisfy the query,
      (b) selectively assigning the identified tables, files, and objects to a leaf vertex of said query graph to optimize retrieving data from the one or more storage nodes,
      (c) processing data sets associated with each vertex of the query graph using separate threads of execution for each vertex of the query graph, wherein leaf vertices of the query graph are performed in parallel, wherein work associated with each vertex of the query graph is performed by one of said one or more compute nodes;
      (d) the one or more compute nodes each periodically persistently storing, on one or more of said storage nodes, recovery state data that describes a present state of processing operations pertaining to said query graph, and
      (e) in response to any of said one or more compute nodes encountering a fault or becoming disabled, any remaining nodes of said one or more compute nodes may continue processing the query graph, by retrieving the recovery state data associated with the query graph stored by each the one or more compute nodes without starting said processing over from the beginning,
   wherein the one or more compute nodes processing the query graph further comprises:
      pre-fetching a data set, preidentified as being responsive to at least a portion of said query, from at least one storage node and maintaining the prefetched data set in volatile memory of at least one compute node; and
   providing a result set for said query.

2. The one or more non-transitory computer-readable storage mediums of claim 1, wherein the one or more compute nodes issue read operation requests against the one or more storage nodes in advance of when results of said read operation requests are required by a compute node responsible for work associated with a vertex of the query graph.

3. The one or more non-transitory computer-readable storage mediums of claim 1, wherein each compute node of said one or more compute nodes issues two or more read operation requests to said one or more storage nodes in parallel.

4. The one or more non-transitory computer-readable storage mediums of claim 1, wherein the composition of the one or more compute nodes changes during the processing of the query.

5. The one or more non-transitory computer-readable storage mediums of claim 1, wherein the one or more storage nodes include at least one data lake, and wherein a data lake is a repository that stores structured data and unstructured data.

6. The one or more non-transitory computer-readable storage mediums of claim 1, wherein the one or more compute nodes processing the query graph further comprises:
   pre-fetching a plurality of data sets, each of which is preidentified as being responsive to at least a portion of said query, from at least one storage node until an amount of bandwidth of said network utilized by said pre-fetching is fully utilized or utilized in excess of a configurable threshold.

7. The one or more non-transitory computer-readable storage mediums of claim 1, wherein the recovery state data comprises in-memory hash tables stored in volatile memory of a node performing a hash-join operation, sort data stored in volatile memory of a node performing a sort operation, and aggregation tables stored in volatile memory of a node performing an aggregation operation.

8. The one or more non-transitory computer-readable storage mediums of claim 1, wherein the recovery state data comprises only data required to resume processing the query graph from a logical checkpoint.

9. A system for executing a query in a disaggregated cluster, comprising:
   one or more processors; and
   one or more non-transitory computer-readable storage mediums that store one or more sequences of instructions, which when executed, cause:
      receiving, at the disaggregated cluster, the query, wherein the disaggregated cluster comprises one or more compute nodes and one or more storage nodes, wherein each of the one or more compute nodes and each of the one or more storage nodes are implemented by separate physical machines accessible over a network, wherein the one or more compute nodes are transient instances operated by a third party, and wherein the operation of the one or more compute nodes can cease during the processing of the query;
      creating, at a particular compute node of the disaggregated cluster, a query graph based on the query, wherein the query graph identifies a hierarchy of vertices, wherein each vertex of the query graph is associated with a set of data responsive to at least a portion of the query;
      the one or more compute nodes processing the query graph by:
         (a) identifying all tables, files, and objects stored on the one or more storage nodes required to retrieve data that satisfy the query,
         (b) selectively assigning the identified tables, files, and objects to a leaf vertex of said query graph to optimize retrieving data from the one or more storage nodes,
         (c) processing data sets associated with each vertex of the query graph using separate threads of execution for each vertex of the query graph, wherein leaf vertices of the query graph are performed in parallel, wherein work associated with each vertex of the query graph is performed by one of said one or more compute nodes;
(d) the one or more compute nodes each periodically persistently storing, on one or more of said storage nodes, recovery state data that describes a present state of processing operations pertaining to said query graph, and
(e) in response to any of said one or more compute nodes encountering a fault or becoming disabled, any remaining nodes of said one or more compute nodes may continue processing the query graph, by retrieving the recovery state data associated with the query graph stored by each the one or more compute nodes without starting said processing over from the beginning,
wherein the one or more compute nodes processing the query graph further comprises:
pre-fetching a data set, preidentified as being responsive to at least a portion of said query, from at least one storage node and maintaining the prefetched data set in volatile memory of at least one compute node; and
providing a result set for said query.

10. The system of claim 9, wherein the one or more compute nodes issue read operation requests against the one or more storage nodes in advance of when results of said read operation requests are required by a compute node responsible for work associated with a vertex of the query graph.

11. The system of claim 9, wherein each compute node of said one or more compute nodes issues two or more read operation requests to said one or more storage nodes in parallel.

12. The system of claim 9, wherein the composition of the one or more compute nodes changes during the processing of the query.

13. The system of claim 9, wherein the one or more storage nodes include at least one data lake, and wherein a data lake is a repository that stores structured data and unstructured data.

14. The system of claim 11, wherein the one or more compute nodes processing the query graph further comprises:
pre-fetching a plurality of data sets, each of which is preidentified as being responsive to at least a portion of said query, from at least one storage node until an amount of bandwidth of said network utilized by said pre-fetching is fully utilized or utilized in excess of a configurable threshold.

15. The system of claim 9, wherein the recovery state data comprises in-memory hash tables stored in volatile memory of a node performing a hash-join operation, sort data stored in volatile memory of a node performing a sort operation, and aggregation tables stored in volatile memory of a node performing an aggregation operation.

16. The system of claim 9, wherein the recovery state data comprises only data required to resume processing the query graph from a logical checkpoint.

17. A process for executing a query in a disaggregated cluster, comprising:
receiving, at the disaggregated cluster, the query, wherein the disaggregated cluster comprises one or more compute nodes and one or more storage nodes, wherein each of the one or more compute nodes and each of the one or more storage nodes are implemented by separate physical machines accessible over a network, wherein the one or more compute nodes are transient instances operated by a third party, and wherein operation of the one or more compute nodes can cease during the processing of the query;
creating, at a particular compute node of the disaggregated cluster, a query graph based on the query, wherein the query graph identifies a hierarchy of vertices, wherein each vertex of the query graph is associated with a set of data responsive to at least a portion of the query;
the one or more compute nodes processing the query graph by:
(a) identifying all tables, files, and objects stored on the one or more storage nodes required to retrieve data that satisfy the query,
(b) selectively assigning the identified tables, files, and objects to a leaf vertex of said query graph to optimize retrieving data from the one or more storage nodes,
(c) processing data sets associated with each vertex of the query graph using separate threads of execution for each vertex of the query graph, wherein leaf vertices of the query graph are performed in parallel, wherein work associated with each vertex of the query graph is performed by one of said one or more compute nodes,
(d) the one or more compute nodes each periodically persistently storing, on one or more of said storage nodes, recovery state data that describes a present state of processing operations pertaining to said query graph, and
(e) in response to any of said one or more compute nodes encountering a fault or becoming disabled, any remaining nodes of said one or more compute nodes may continue processing the query graph, by retrieving the recovery state data associated with the query graph stored by each the one or more compute nodes without starting said processing over from the beginning,
wherein the one or more compute nodes processing the query graph further comprises:
pre-fetching a data set, preidentified as being responsive to at least a portion of said query, from at least one storage node and maintaining the prefetched data set in volatile memory of at least one compute node; and
providing a result set for said query.

18. One or more non-transitory computer-readable storage mediums storing one or more sequences of instructions for executing a query in a disaggregated cluster, which when executed, cause:
receiving, at the disaggregated cluster, the query, wherein the disaggregated cluster comprises one or more compute nodes and one or more storage nodes, wherein each of the one or more compute nodes and each of the one or more storage nodes are implemented by separate physical machines accessible over a network, and wherein the composition of the one or more compute nodes changes during the processing of the query;
creating, at a particular compute node of the disaggregated cluster, a query graph based on the query, wherein the query graph identifies a hierarchy of vertices, wherein each vertex of the query graph is associated with a set of data responsive to at least a portion of the query;

the one or more compute nodes processing the query graph by:
- (a) identifying all tables, files, and objects stored on the one or more storage nodes required to retrieve data that satisfy the query,
- (b) selectively assigning the identified tables, files, and objects to a leaf vertex of said query graph to optimize retrieving data from the one or more storage nodes,
- (c) processing data sets associated with each vertex of the query graph using separate threads of execution for each vertex of the query graph, wherein leaf vertices of the query graph are performed in parallel, wherein work associated with each vertex of the query graph is performed by one of said one or more compute nodes;
- (d) the one or more compute nodes each periodically persistently storing, on one or more of said storage nodes, recovery state data that describes a present state of processing operations pertaining to said query graph, and
- (e) in response to any of said one or more compute nodes encountering a fault or becoming disabled, any remaining nodes of said one or more compute nodes may continue processing the query graph, by retrieving the recovery state data associated with the query graph stored by each the one or more compute nodes without starting said processing over from the beginning, wherein the one or more compute nodes processing the query graph further comprises:
  pre-fetching a data set, preidentified as being responsive to at least a portion of said query, from at least one storage node and maintaining the prefetched data set in volatile memory of at least one compute node; and providing a result set for said query.

\* \* \* \* \*